United States Patent [19]

Li et al.

[11] 4,162,277
[45] Jul. 24, 1979

[54] THERMOPLASTIC RESINS WITH POLYINDENE OR COUMARONE-INDENE RESIN

[75] Inventors: George S. Li, Aurora; Irving Rosen, Warrensville Heights, both of Ohio

[73] Assignee: The Standard Oil Company, Cleveland, Ohio

[21] Appl. No.: 909,323

[22] Filed: May 24, 1978

Related U.S. Application Data

[63] Continuation of Ser. No. 816,245, Jul. 18, 1977, Pat. No. 4,117,040, which is a continuation of Ser. No. 644,122, Dec. 24, 1975, Pat. No. 4,066,717.

[51] Int. Cl.² ............................................. C08L 69/00
[52] U.S. Cl. .................................. 525/146; 525/206; 525/210
[58] Field of Search .............................. 260/873, 829

[56] References Cited

U.S. PATENT DOCUMENTS

| 3,294,862 | 12/1966 | Prochaska ........................... 260/829 |
| 3,639,499 | 2/1972 | Snodgrass et al. ................... 260/829 |

*Primary Examiner*—Carman J. Seccuro
*Attorney, Agent, or Firm*—John F. Jones; Sherman J. Kemmer

[57] ABSTRACT

Certain physical properties, such as heat-distortion temperature and flexural modulus, of certain commercially available thermoplastic resins are improved by blending with polyindene or coumarone-indene resins.

1 Claim, No Drawings

THERMOPLASTIC RESINS WITH POLYINDENE OR COUMARONE-INDENE RESIN

This is a continuation of U.S. patent application Ser. No. 816,245 filed on July 18, 1977, now U.S. Pat. No. 4,117,040 which in turn is a continuation of application Ser. No. 644,122 filed on Dec. 24, 1975 now U.S. Pat. No. 4,066,717.

The present invention relates to a method for improving physical properties of known commercially available thermoplastic synthetic resins by incorporating therein some polyindene and/or indene-coumarone resin and to the resulting blends.

Coumarone-indene resins and polyindene are well known, relatively inexpensive resins having been used for a variety of purposes in the past including as fillers or extenders for rubber, and in asphalt tile. Coumarone-indene resins and polyindene are inexpensive by-products of the coal tar industry which are usually prepared by the acid catalyzed polymerization of indene or coumarone-indene mixtures. Commercially available coumarone-indene copolymers are usually made from about 10% by weight of coumarone and about 90% by weight of indene, a mixture which occurs in coal tar residues.

We have discovered that some of the physical properties of certain well known commercially available thermoplastic resins, such as vinyl chloride homopolymers and copolymers, polyolefins including polypropylene, polyethylene, polystyrenes, polyesters including polyethylene terephthalate, ABS, MBS, polycarbonates, and the like, are dramatically improved by blending some polyindene and/or coumarone-indene resin with these materials.

In general, when from 1 to 50 parts, 5 to 30 parts preferred, by weight per hundred of resin (phr) of polyindene or coumarone-indene resin are blended with a resin of the aforementioned type, the physical properties including heat-distortion temperature, flexural modulus and other properties of the original resin are improved.

Thus, the blending of polyindene and/or coumarone-indene resins with certain commercial thermoplastic resins will generally lower the cost of the blend, give better processability, give higher heat-distortion temperature, give higher flexural modulus and in some cases give lower gas and vapor permeation rates to the blend.

According to the process of this invention, the blends of polyindene or coumarone-indene resin and polystyrene, for instance, can be made in any of a number of ways as by blending on a mill, in a banbury mixer or other type of internal mixer such as in a Brabender mixer.

In the following examples which further illustrate this invention, the amounts of the various materials listed are given in parts by weight unless otherwise specified.

Example 1

A. Fifty parts of commercially available polyvinyl chloride were blended in a Brabender internal mixer at 210° C. for 5 minutes with 7.5 parts of coumarone-indene resin (Cumar LX-509, Neville Chemical Company) (softening temperature of 120° C.). Test specimens were molded from the blend.

B. Test specimens were molded as in A above from polyvinyl chloride.

The test specimens from A and B above were tested for ASTM (D-648) heat-distortion temperature (HDT) and ASTM flexural modulus with the following results:

| Specimen | HDT (°C.) | Flexural Modulus (psi) |
|---|---|---|
| A | 67 | $8.67 \times 10^5$ |
| B | 58 | $4.02 \times 10^5$ |

Example 2

A. Fifty parts of commercially available polystyrene were blended in a Brabender internal mixer at 210° C. for 5 minutes with 7.5 parts of coumarone-indene resin. Test specimens were molded from the blend.

B. Fifty parts of polystyrene were blended in a Brabender internal mixer at 210° C. for 5 minutes with 7.5 parts of polyindene (prepared from indene in toluene with $BF_3$ initiator, softening temperature of 240° C.). Test specimens were molded from the blend.

C. Test specimens were molded from polystyrene.

The test specimens from A, B and C of this example were tested for ASTM heat-distortion temperature (HDT) and ASTM flexural modulus with the following results:

| Specimen | HDT (°C.) | Flexural Modulus (psi) |
|---|---|---|
| A | 79 | $2.99 \times 10^5$ |
| B | 83 | $3.40 \times 10^5$ |
| C | 77 | $2.54 \times 10^5$ |

Example 3

A. Fifty grams of commercially available polycarbonate were blended with 7.5 grams of polyindene at 230° C. for 5 minutes in a Brabender internal mixer. Eight grams of this blend were compression molded at 215° C. (6000 psi) to give a ⅛-inch test bar.

B. A test bar of the polycarbonate alone was prepared as in A above for comparison purposes. The following results were obtained:

| Specimen | HDT (°C.) | Flexural Modulus (psi) |
|---|---|---|
| A | 140 | $3.29 \times 10^5$ |
| B | 136 | $3.15 \times 10^5$ |

Example 4

A. Fifty grams of commercially available polymethyl methacrylate were blended with 7.5 grams of coumarone-indene copolymer in an internal mixer. Test bars of the blend were then molded.

B. Test bars of the polymethyl methacrylate used in A above were prepared for comparison purposes. The following results were observed:

| Specimen | HDT (°C.) | Flexural Modulus (psi) |
|---|---|---|
| A | 91 | $4.63 \times 10^5$ |
| B | 85 | $4.11 \times 10^5$ |

Example 5

A. Fifty grams of commercially available polyvinyl acetate were blended with 7.5 grams of coumarone-indene copolymer in an internal mixer. Test bars of the blend were then molded.

B. Test bars of the polyvinyl acetate used in A above were prepared for comparison purposes. The following results were obtained:

| Specimen | HDT (°C.) | Flexural Modulus (psi) |
|---|---|---|
| A | 40 | $10.2 \times 10^5$ |
| B | <25 | $0.01 \times 10^5$ |

We claim:
1. A composition having improved physical properties comprising a blend of (A) 100 parts by weight of a commercially available thermoplastic synthetic resin and (B) from 1 to 50 parts by weight of a member selected from the group consisting of polyindene and a coumarone-indene resin.

* * * * *

UNITED STATES PATENT AND TRADEMARK OFFICE
CERTIFICATE OF CORRECTION

PATENT NO. : 4,162,277
DATED : 7-24-79
INVENTOR(S) : George S. Li and Irving Rosen It is certified that error appears in the above-identified patent and that said Letters Patent are hereby corrected as shown below:

Column 4, lines 9 and 10, delete "a commercially available thermoplastic synthetic resin" and insert ---a polycarbonate---.

Column 4, lines 11 and 12, delete "a member selected from the group consisting of".

Column 4, lines 12 and 13, delete "and a coumarone-indene resin".

Signed and Sealed this

Tenth Day of March 1981

[SEAL]

Attest:

Attesting Officer

RENE D. TEGTMEYER

Acting Commissioner of Patents and Trademarks